June 16, 1942.  W. A. HILL  2,286,486
POWER MECHANISM FOR HAY BALERS
Filed Aug. 2, 1939  3 Sheets-Sheet 1
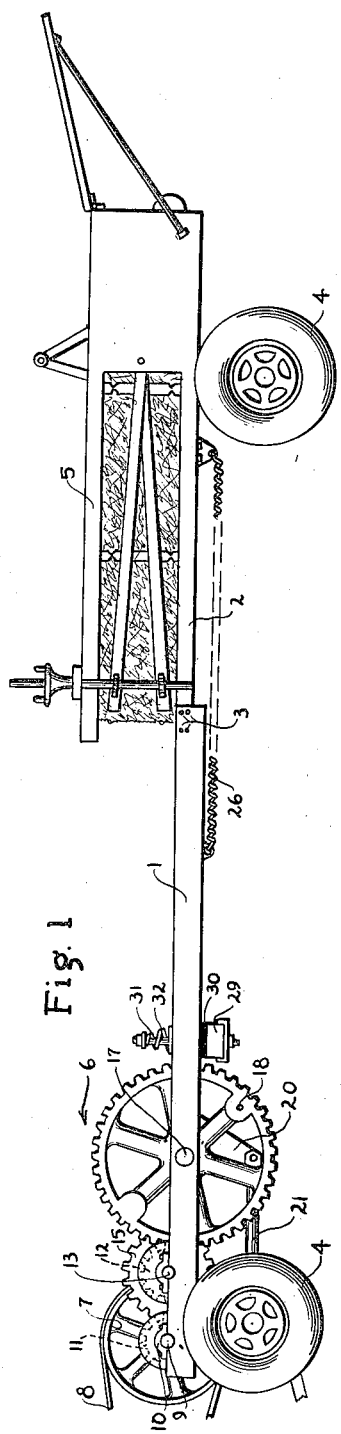
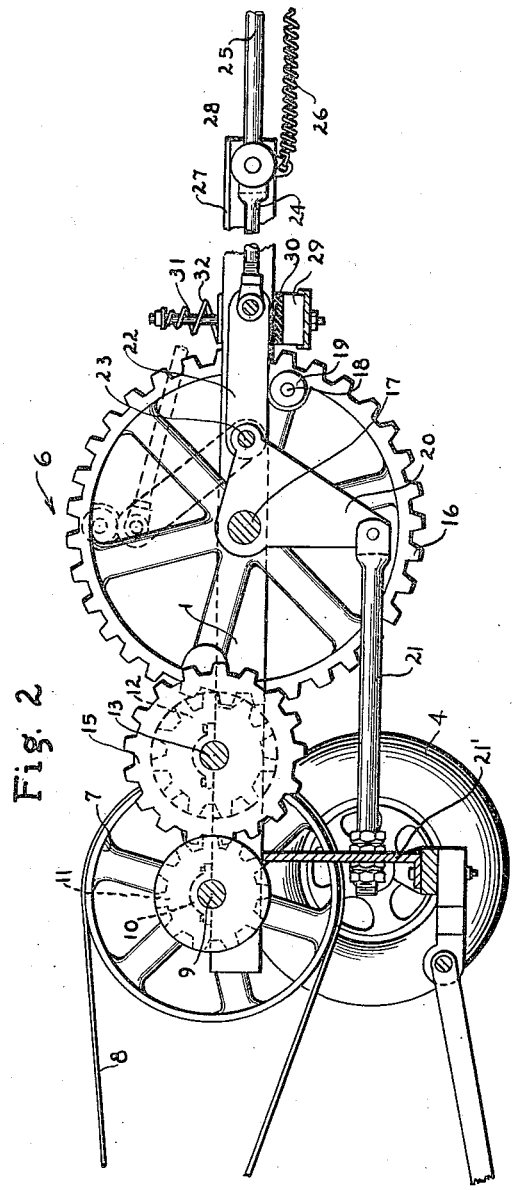
Inventor
Willie A. Hill
By J. Preston Swecker
his Attorney

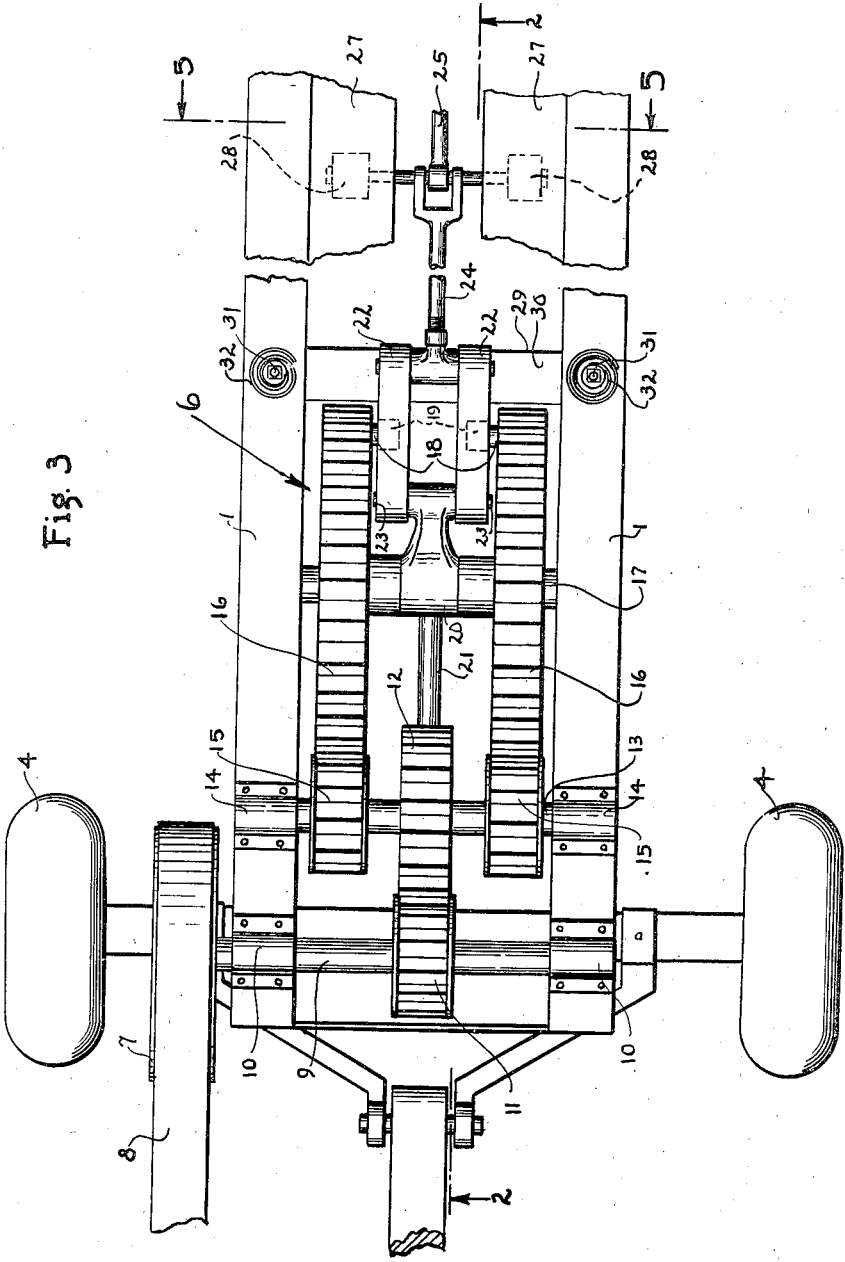

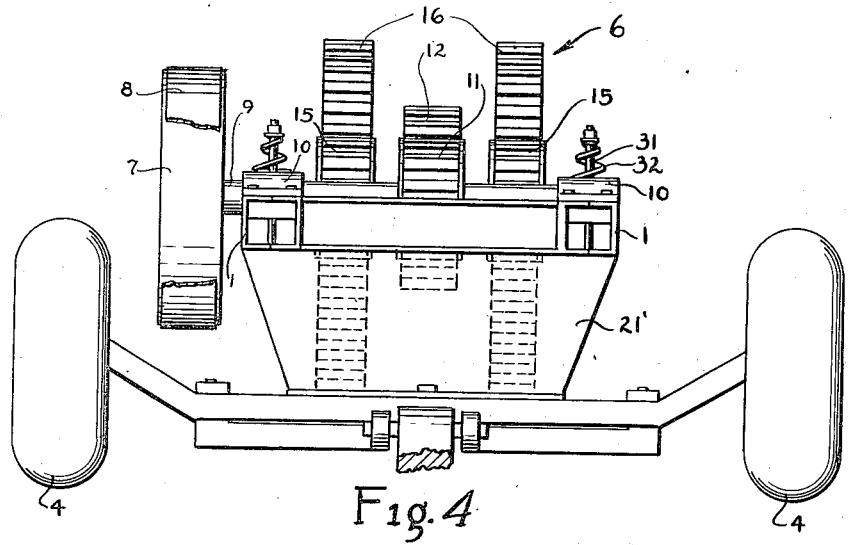

Patented June 16, 1942

2,286,486

UNITED STATES PATENT OFFICE 2,286,486

POWER MECHANISM FOR HAY BALERS

Willie A. Hill, De Leon, Tex.

Application August 2, 1939, Serial No. 288,044

9 Claims. (Cl. 74—44)

This invention relates to improvements in hay balers, and more particularly to the power mechanism for operating the baling means.

Attempts have been made heretofore to operate hay balers by power, but these have been impractical due to their cost and speed of operation, resulting from the complexity of these machines and to their manner of operation.

The object of this invention is to improve and simplify the construction and manner of operation of the power drive for a hay baler, while providing a strong pressing action and a comparatively long dwell between the pressing strokes for filling the baler box with hay. The invention also provides a progressively increasing power stroke and utilizes shock absorbing means to cushion the return of the baler plunger to its normal position.

This invention will be attached to any pull type press so as to give a shorter pressing cycle with a longer filling cycle. However, the power of the pressing action is applied in such a manner as to give a quick pressing of the loose hay at the end of the stroke, and to give an increased leverage so as to apply the greater power at the end of the stroke where it is required.

I have shown a preferred embodiment of my invention in the accompanying drawings, in which—

Fig. 1 is a side elevation of a hay baler with my improved power unit connected therewith.

Fig. 2 is a vertical longitudinal sectional view through the power unit substantially on the line 2—2 of Fig. 3.

Fig. 3 is a top plan view of the power unit with parts broken away.

Fig. 4 is an end elevation thereof; and

Fig. 5 is a vertical transverse sectional view substantially on the line 5—5 of Fig. 2.

The invention is shown in Fig. 1 as applied to a hay baler of conventional construction, in which a power unit frame is designated generally by the numeral 1, comprising side bars joined at their front ends to a baler frame 2 by means of rivets or bolts 3 or other suitable fastening means such as welding. The entire machine is mounted on road engaging wheels 4 for transportation in the usual way.

Mounted on the frame 2 is a conventional baler box 5 adapted to receive hay or other suitable material through an opening in the top thereof. This baler box 5 is provided with the usual pressing mechanism designed to compress the material fed thereinto by a pull stroke, to the left in Fig. 1. Such mechanism may be of any suitable and well-known type and is illustrated in detail.

My present invention comprises a power unit for operating the pressing mechanism of the hay baler, which power unit is designated generally by the numeral 6 and is mounted on the frame 1 at the opposite end portion thereof from the baler box. This power unit comprises a drive pulley 7 which is driven from any suitable source of power by a belt 8. The pulley 7 is mounted on a shaft 9 which is journaled in bearings 10 at opposite ends thereof, and which bearings are secured upon the side bars 1 of the frame. Also mounted on the shaft 9 intermediate the ends thereof, is a pinion 11 which meshes with a gear 12 mounted on a shaft 13 that extends parallel with the shaft 9 and is also mounted on the side bars 1 of the frame in bearings 14. The shaft 13 carries a pair of pinions 15 mounted thereon on opposite sides of the gear 12, which pinions 15 mesh with power gears 16 respectively, which power gears 16 are mounted on a shaft 17 which is journaled at its opposite ends in bearings in the side bars 1 of the frame. Each of the gears 16 has an inwardly projecting pin 18 carried thereby upon which is journaled a roller 19, which rollers are arranged in axial alinement with each other between the gears 16.

Mounted in a stationary position on the shaft 17 between the gears 16 is a supporting arm 20 arranged in a suspended position beneath the shaft. The lower end of the arm 20 is held against rotation by an adjustable rod 21 connected therewith and adjustably connected with an upstanding support 21' of the frame.

The suspended arm 20 also has connected therewith a pair of links 22 attached at one end to a pivot pin 23 which extends through a portion of the arm 20, whereby said links are free to move in an arcuate direction about said pivot pin to the dotted line position shown in Fig. 2. The links 22 are attached at their opposite ends from the pivot pin 23 to a connecting rod 24, which in turn is pivotally connected with a plunger rod 25 that extends to and actuates in a forward direction (to the left in Figs. 1 and 2) the baler plunger within the baler box 5. The plunger is returned in its opposite direction by a spring 26 attached to the plunger 25 at one end and to the baler box 5 at its opposite end, which serves also to return the links 22 and connecting rod 24 to their normal positions.

It will be evident that when the parts are operated normally, the links 22 will lie normally in the positions shown in full lines therein. However, when the rollers 19 are moved by the gears into engagement with the links 22, these rollers will serve to swing the links around their pivot pin 23 while the rollers are passing along the links to the outer ends thereof where they pass out of engagement with said ends of the links, releasing the latter substantially in the dotted line positions shown in Fig. 2. The links will have been moved under the influence of the rollers through approximately 135°, as shown, before the rollers pass out of contact therewith. This represents the power stroke of the baler during which the links have acted through the connecting rod 24 and plunger rod 25 to move the plunger in the baler box in its compressing motion to an extent permitted by the material therein. When the links 22 are released by the rollers 19, the spring 26 acts on these parts to return them to their initial positions, withdrawing the plunger and permitting a renewed filling of the baler box. This filling may continue during the period of time required for the gears to rotate to carry the rollers 19 from the dotted line position shown in Fig. 2 to the full line position therein, when the rollers again contact the links to actuate the plunger rod as described. Thus a compressing stroke is provided through substantially 90° of rotation of the drive gear while the remainder of the rotation of the drive gear is of greater duration to permit the maximum time for filling.

Each of the side frame members 1 has an inwardly extending guide track 27 thereon, as shown in Fig. 3, against which tracks bear rollers 28 connected with the plunger rod 25 to insure a straight line movement of the plunger rod under the action of the links 22 and connecting rod 24.

Extending transversely between the side bars 1 is a bumper 29 which is provided with a cushion 30, preferably of soft resilient material such as soft rubber, arranged in position to be engaged by the links 22. The bumper 29 is supported at its opposite ends by bolts 31 which extend through said ends and loosely through the side frame bars 1, having springs 32 interposed between the said frame side bars and heads or nuts on the bolts to support the bolts and the bumper resiliently and thereby increase the cushion effect thereof.

It will be apparent that this power mechanism will provide a power stroke of approximately 90°, as shown, with proportionately increasing power toward the end of the stroke for a better compression action for the hay or other material. This allows a dwell period between the successive power strokes, of approximately 270°, to permit filling of the baler box. The extent of pressing action may be varied by adjusting the effective length of the links 22.

A press of this character will materially increase the capacity of the baler over other machines provided heretofore, and the hay is pressed into bales of greater density than can be obtained with balers utilizing the conventional mechanism.

It will be understood that the invention is not limited to its use in hay balers, but it may be utilized for the baling of any materials under power, wherever it may be desired.

I claim:

1. The combination with hay baler mechanism, of a power unit therefor comprising a plunger rod adapted to actuate the baler mechanism, a link pivotally supported at one end and pivotally connected at its opposite end with the plunger rod, means normally tending to hold said link approximately on dead-center, a rotary member adjacent said link and having a pin carried thereby eccentrically thereof in position to engage the link intermediate its pivotal connections for moving said link from said dead-center position and actuating the plunger rod.

2. A power device for a hay baler comprising a link adapted to be connected at one end with a baler plunger rod, a stationary arm pivotally supporting the opposite end of the link, a rotary member, a pin carried by the rotary member eccentrically thereof in position to engage the link upon rotation of the member and move the same to actuate the plunger rod in one direction, a frame structure for the power device, and a tie rod connected between the arm and frame structure and adjustable lengthwise thereof for varying the pivot point of the link.

3. A power device for a hay baler, comprising a plunger rod adapted to be connected with baler mechanism, a link pivotally connected at one end with the plunger rod, means pivotally supporting the opposite end of the link for swinging movement thereof, means normally tending to hold said link approximately on dead-center, a rotary member adjacent said link, and a roller carried by said rotary member eccentrically thereof in position to engage and actuate the link to apply a pulling action to the plunger rod moving the same from dead-center position.

4. A power device for a hay baler, comprising a plunger rod adapted to be connected with baler mechanism, a link pivotally connected at one end with said plunger rod, means normally tending to hold said link approximately on dead-center, a stationary arm pivotally supporting the opposite end of the link, speed-reducing intermeshing gears, and a roller carried by one of said gears eccentrically thereof in position to engage the link and apply a pulling action to the same to actuate the plunger rod moving the same from said dead-center position.

5. A power device for a hay baler, comprising a plunger rod adapted to be connected with baler mechanism, a link pivotally connected at one end with said plunger rod, a stationary arm pivotally supporting the opposite end of the link, speed-reducing intermeshing gears, a roller carried by one of said gears eccentrically thereof in position to engage the link and apply a pulling movement to actuate the plunger rod in one direction, rollers connected with the plunger rod, means for guiding the rollers for approximately straight-line movement of the plunger rod, and resilient means connected with the plunger rod for returning the same in the opposite direction.

6. A power device for a hay baler, comprising a plunger rod adapted to be connected with baler mechanism, a link pivotally connected at one end with said plunger rod, a stationary arm pivotally supporting the opposite end of the link, speed-reducing intermeshing gears, a roller carried by one of said gears eccentrically thereof in position to engage the link and move the same to actuate the plunger rod in one direction, a shaft pivotally mounting said arm, a frame structure for the power device, and a tie rod connected between the arm and frame structure and adjustable lengthwise thereof for varying the pivot point of the link.

7. A power device for a hay baler, comprising a supporting frame, power reducing intermeshing gears mounted on said frame, and including a pair of gears arranged in side by side spaced relation, a shaft supporting said pair of gears, an arm mounted on the shaft between the pair of gears in a stationary position, a pair of links pivotally connected with the arm adjacent the respective gears of said pair, rollers carried by the pair of gears and projecting inwardly therefrom in axial alignment in positions to engage under the links to swing the same about their pivots during rotation of the pair of gears, a connecting rod pivotally connected with the opposite ends of the pair of links, a plunger rod pivotally connected with the outer end of the connecting rod, and means for guiding the plunger rod in straight-line movement, the rollers being arranged to engage the links and move the same in a direction to apply a pulling action to the connecting and plunger rods.

8. A power device for a hay baler comprising a plunger rod adapted to actuate baler mechanism, a link pivotally connected with said plunger rod at one end and pivotally supported at its opposite end, means movable into engagement with one side of said link to swing the same about its pivotal support for actuating the plunger rod in one direction and movable out of engagement with said link at the end of said movement, resilient means for returning the link and connecting rod to their initial positions upon disengagement by said actuating means, and a resilient bumper structure in position for engagement by the link upon said return movement to cushion the shock thereof, said bumper structure being arranged in position to hold the link approximately on dead-center position substantially in longitudinal alignment with the plunger rod.

9. A power device for a hay baler comprising a plunger rod adapted to actuate baler mechanism, a link pivotally connected with said plunger rod at one end and pivotally supported at its opposite end, means movable into engagement with one side of said link to swing the same about its pivotal support for actuating the plunger rod in one direction and movable out of engagement with said link at the end of said movement, resilient means for returning the link and connecting rod to their initial positions upon disengagement by said actuating means, and a resilient bumper structure in position for engagement by the link upon said return movement to cushion the shock thereof, said bumper structure including a transverse member having resilient means in position for engagement by the link, and resilient means for supporting the opposite end portions of said transverse member.

WILLIE A. HILL.